United States Patent
Aoyagi et al.

(10) Patent No.: US 6,222,704 B1
(45) Date of Patent: Apr. 24, 2001

(54) SUSPENSION ASSEMBLY WITH RESILIENT SHOCK BUMPERS FOR A DISK DRIVE DEVICE

(75) Inventors: Akihiko Aoyagi, Fujisawa (JP); David W. Albrecht, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,305

(22) Filed: May 3, 2000

Related U.S. Application Data

(62) Division of application No. 09/054,173, filed on Apr. 2, 1998, now Pat. No. 6,072,664.

(30) Foreign Application Priority Data

Apr. 16, 1997 (JP) .................................................. 9-099209

(51) Int. Cl.[7] ...................................................... G11B 5/55
(52) U.S. Cl. ...................................................... 360/244.9
(58) Field of Search ........................... 360/244.5–244.7, 360/244.9, 245.9

(56) References Cited

U.S. PATENT DOCUMENTS

| | | | |
|---|---|---|---|
| 5,862,017 | * | 1/1999 | Kohira et al. ........................ 360/104 |
| 5,864,446 | * | 1/1999 | Endo et al. ........................... 360/104 |
| 5,870,258 | * | 2/1999 | Khan et al. ........................... 360/104 |

FOREIGN PATENT DOCUMENTS

| | | |
|---|---|---|
| 3-71477 | 3/1991 | (JP) . |
| 9-22570 | 1/1997 | (JP) . |

* cited by examiner

*Primary Examiner*—Robert S. Tupper
(74) *Attorney, Agent, or Firm*—Douglas R. Millett

(57) ABSTRACT

The head support mechanism is divided into the three portions, i.e. a rear portion one end of which can be pivotally mounted, a front portion supporting a slider including a read/write head for reading data from the magnetic recording disk or writing data to the magnetic recording disk, and a flexible hinge portion connecting the rear portion and the front portion. At least one extruded portion is provided on a surface of the front portion opposing to the recording disk at position adjacent to the flexible hinge portion. The extruded portion is coated by a resilient layer made of a material selected from a group consisting of polyimide, rubber, epoxy resin, silicone rubber, polyvinylchloride, polybutadiene and polyetherurethane.

13 Claims, 7 Drawing Sheets

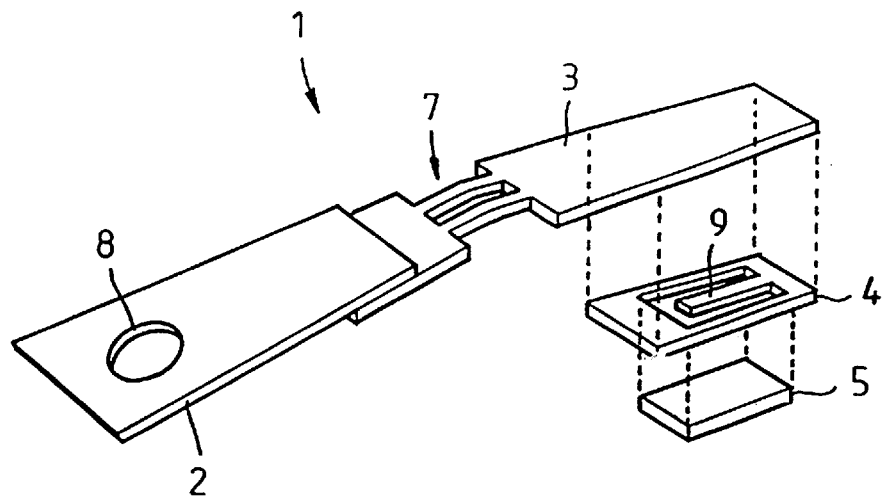
F I G. 1
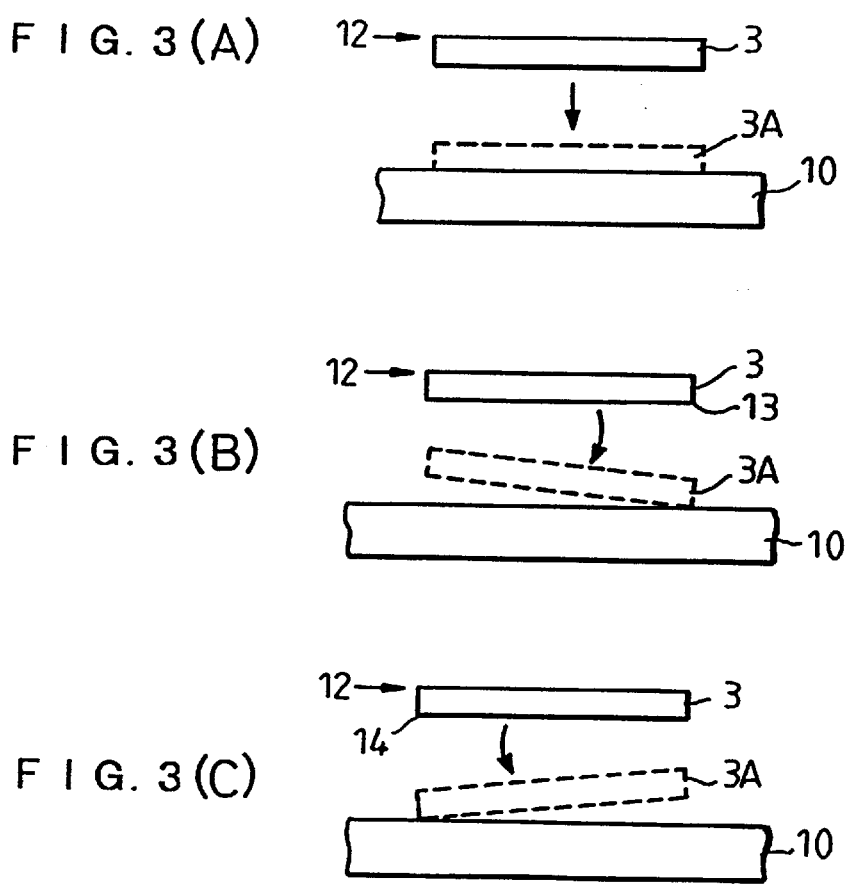
F I G. 3

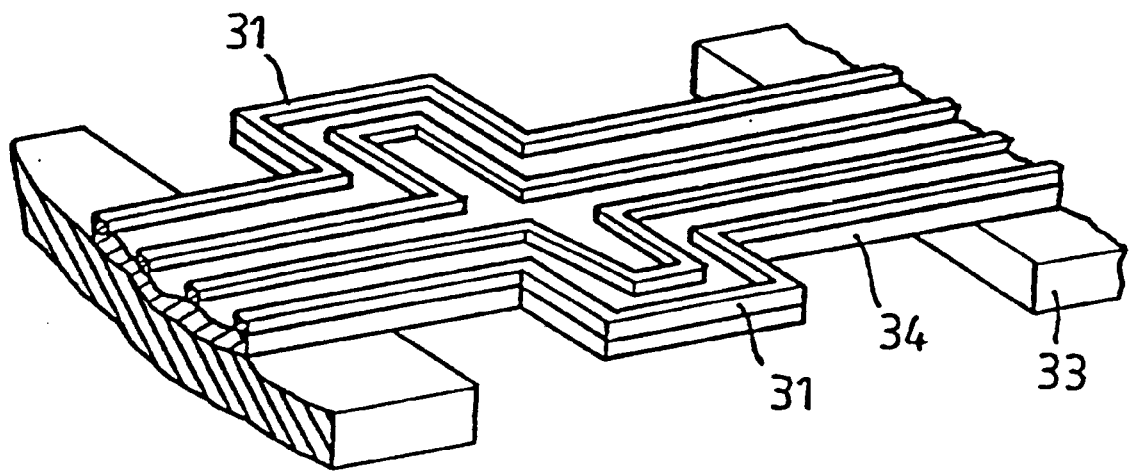
F I G. 5
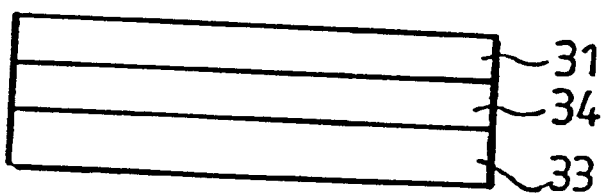
F I G. 6

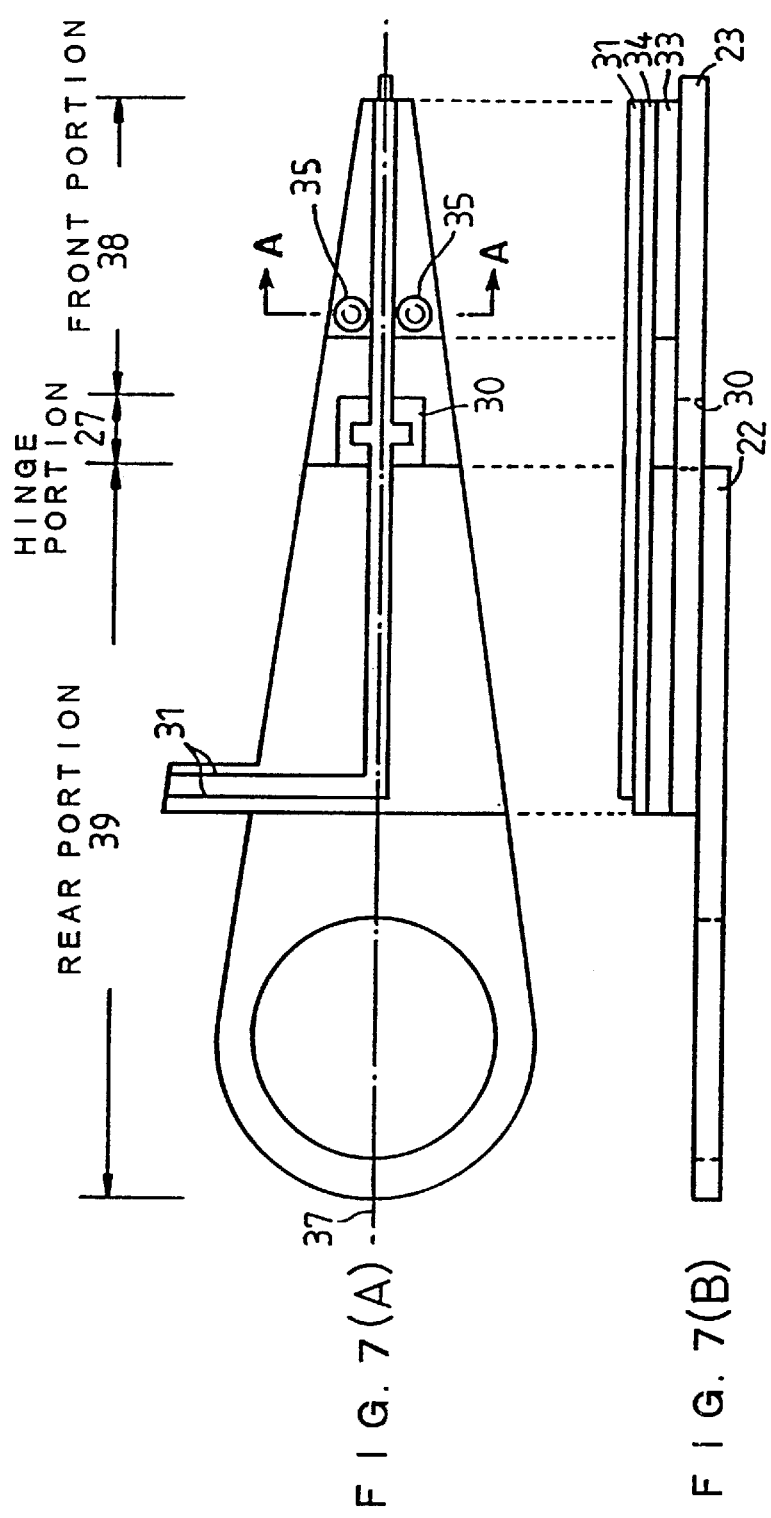
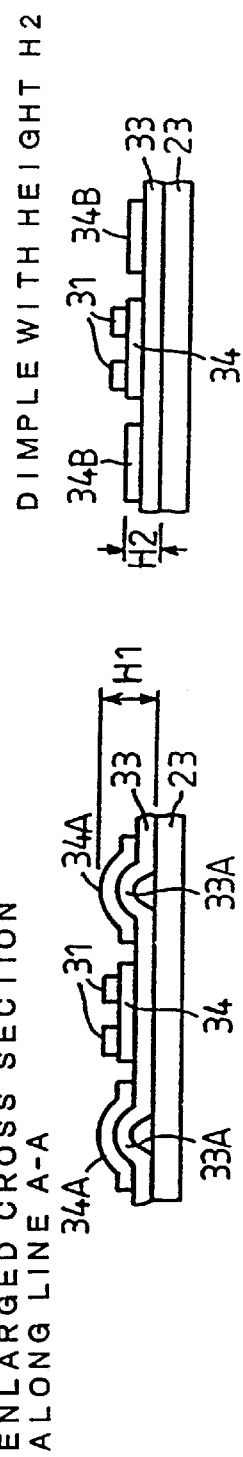
FIG. 7(A)
FIG. 7(B) ENLARGED CROSS SECTION ALONG LINE A-A
FIG. 7(C)
FIG. 7(D) DIMPLE WITH HEIGHT H2

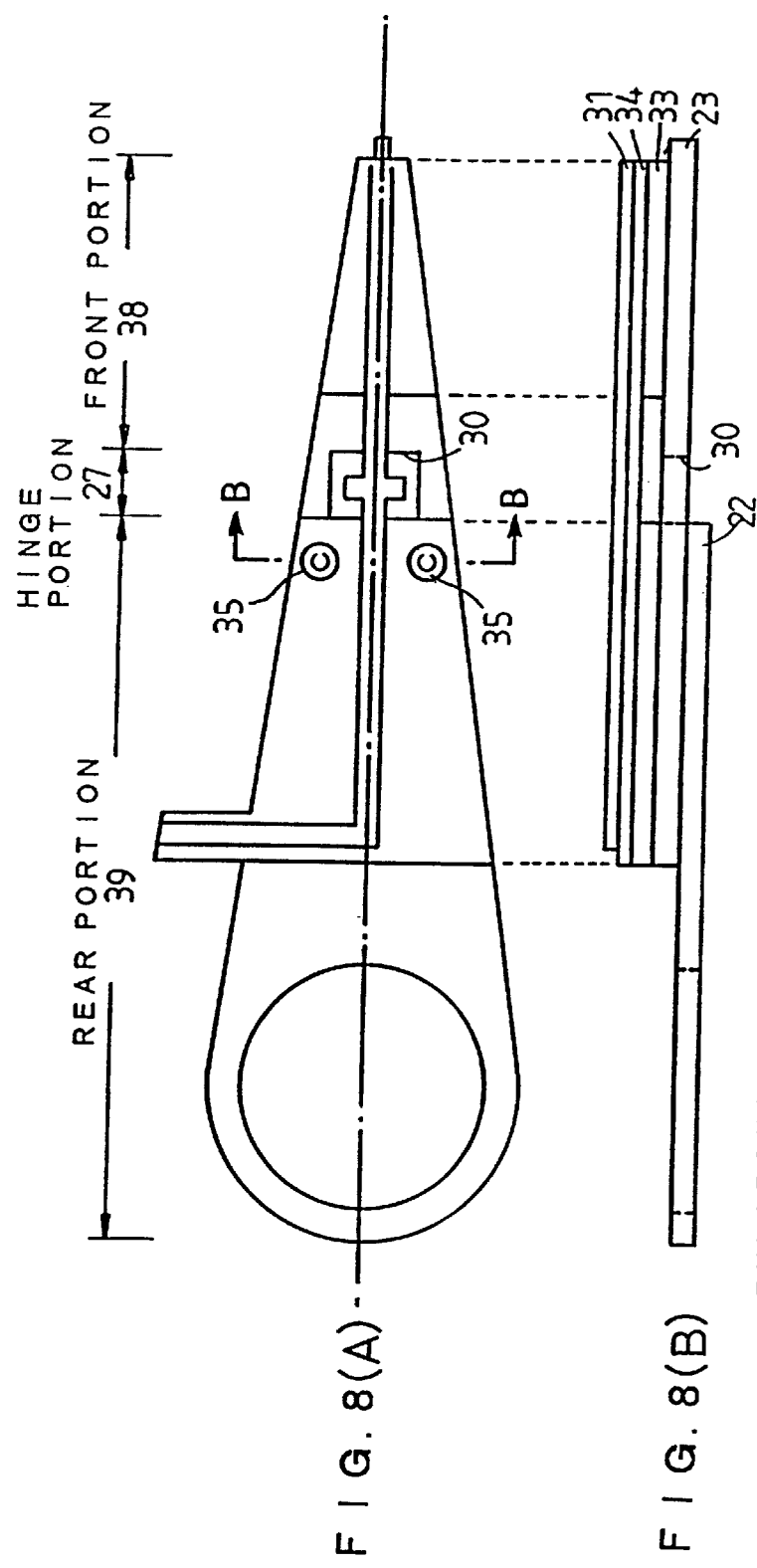

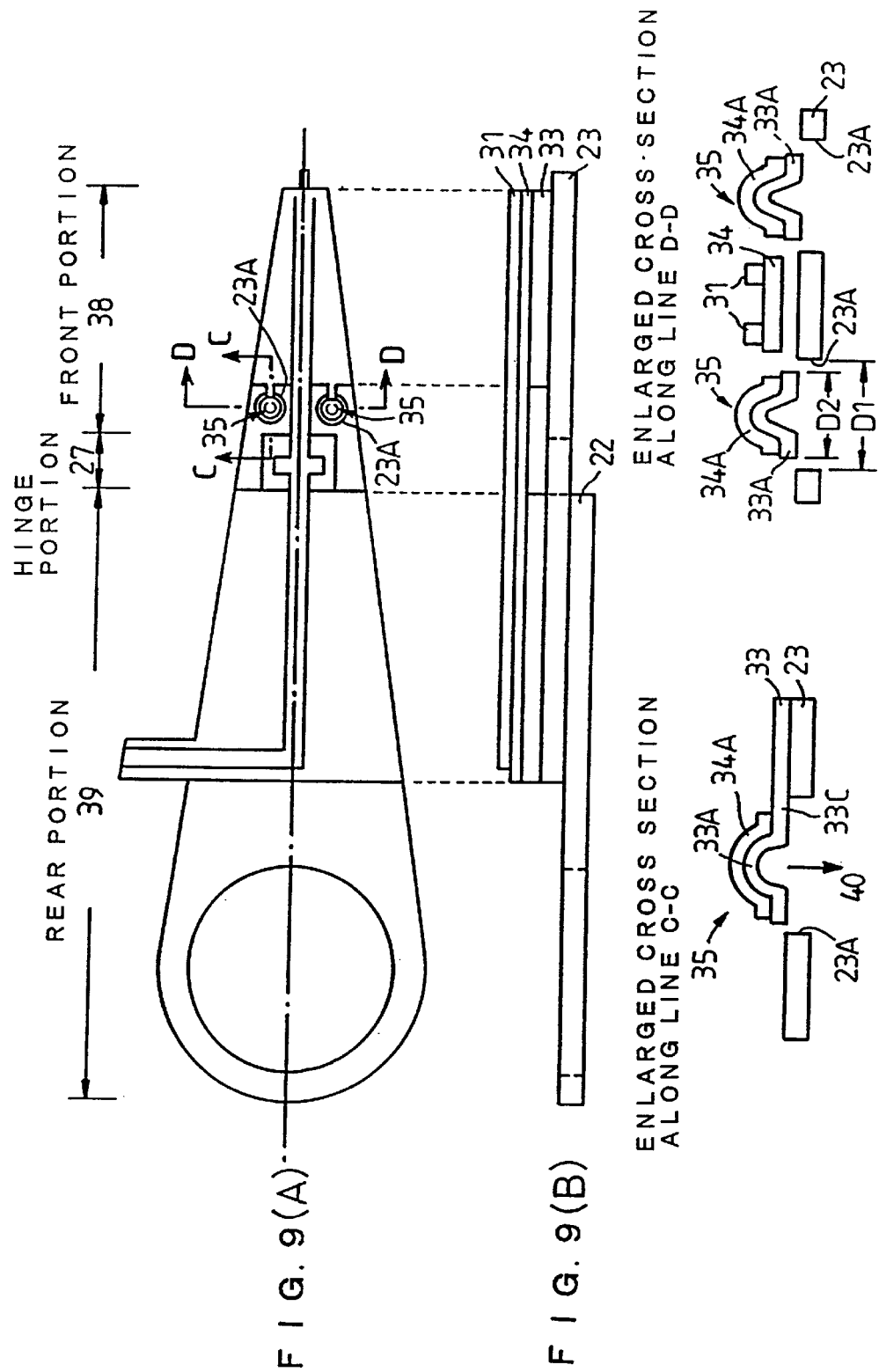

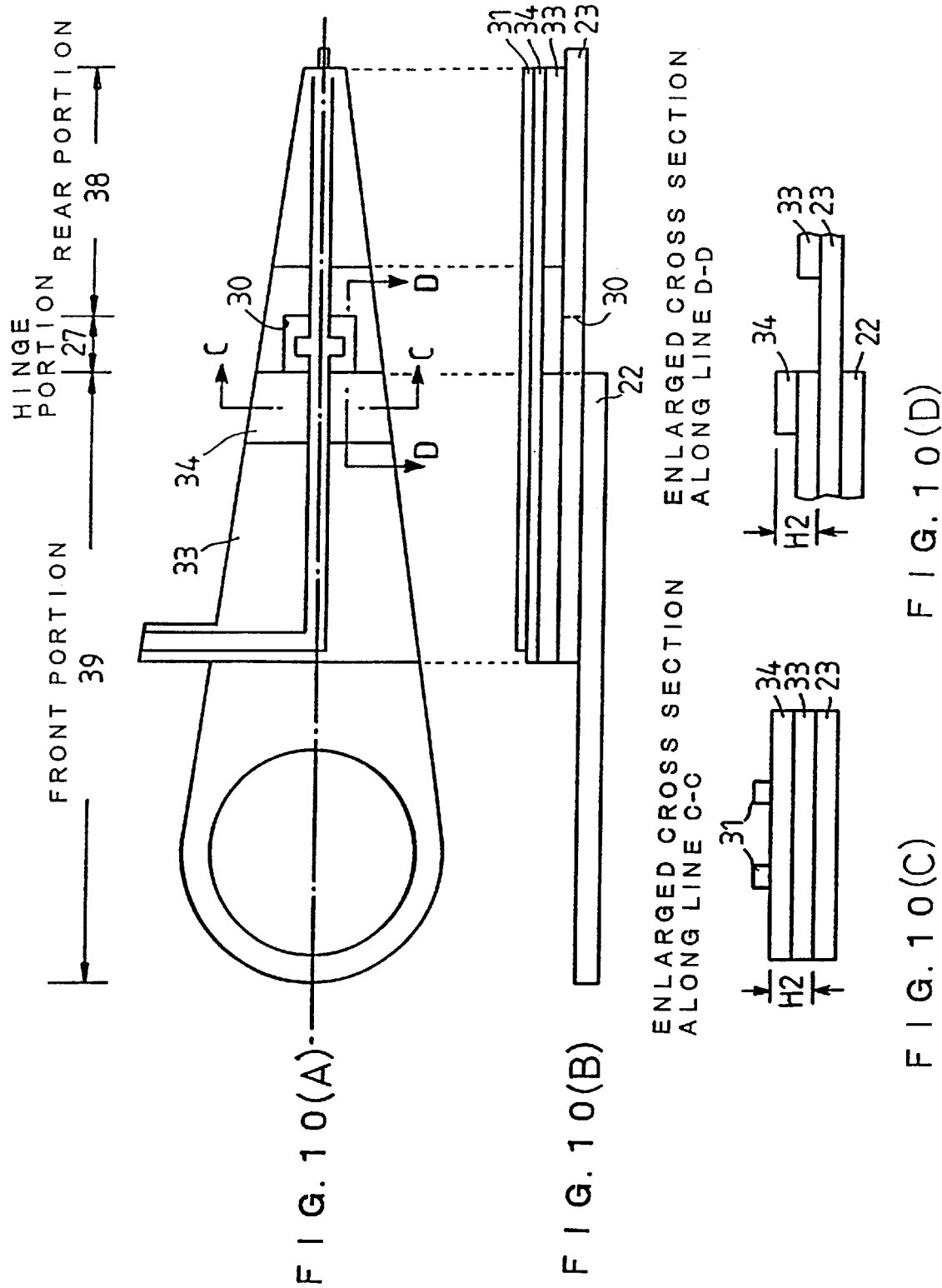

SUSPENSION ASSEMBLY WITH RESILIENT SHOCK BUMPERS FOR A DISK DRIVE DEVICE

This application is a divisional of application Ser. No. 09/054,173, filed on Apr. 2, 1998, entitled "Suspension Assembly With Resilient Shock Bumpers For A Disk Drive Device", in the name of Akihiko Aoyagi and David W. Albrecht now U.S. Pat. No. 6,072,664.

FIELD OF THE INVENTION

The present invention relates to a suspension assembly of high shock resistance and a hard disk drive device in which a suspension assembly of high shock resistance is implemented.

BACKGROUND OF THE INVENTION

The FIG. 1 shows a structure of a prior suspension assembly 1. The suspension assembly 1 includes a mount plate 2, a load beam 3, a flexure 4 and a slider 5. The mount plate 2 has an aperture 8 provided on one end, through which a shaft 11 (FIG. 2) fixed on a frame of the hard disk drive device is fitted for rotatably positioning the plate 2. One end of the load beam 3 is fixed on the other end of the mount, plate 2. The load beam 3 can flexibly bend at a hinge portion 7. The flexure 4 is attached on a lower surface of the load beam 3, and includes an extended member 9. The slider 5 including a read/write head is supported on the member 9, which provides a gimbal type supporting mechanism for the read/write head. The read/write head is mounted on a lower surface of the slider 5, and writes the data to a magnetic recording disk 10 (FIG. 2) or reads the data from the disk 10.

The small size hard disk drive device has been used as a memory of a portable personal computer. The thickness of the mount plate 2, the load beam 3 and the flexure 4 of the suspension assembly made of stainless steel has been made thinner to allow more disks to be configured on a spindle and to increase the storage capacity of the hard disk device.

A problem resulting from thinning the suspension assembly 1 is that, with left end of the suspension assembly 1 being mounted on the shaft 11 on the frame and with the slider 5 and the head at the right end thereof being landed on the surface of the magnetic recording disk 10, the suspension assembly 1 is entirely bent from its normal position 12 toward the magnetic recording disk 10 when an unexpected shock is applied to the personal computer, as shown in the FIG. 2. A sharp edge of the load beam 3 or a sharp edge of the flexure 4 contacts or collides with the surface of the magnetic recording disk 10, resulting in damage of its surface, so that a desired read/write operation is not performed.

The FIGS. 3(A), (B) and (C) show the movement of the portion of the load beam 3 taken along the line A—A in the FIG. 2. The FIG. 3(A) shows a parallel mode in which the load beam 3 is moved in parallel from its normal position 12 to the disk 10. The FIGS. 3(B) and (C) show a twist mode in which the load beam 3 is twisted in the movement towards the disk 10, and the surface of the magnetic recording disk 10 is damaged by the right side edge 13 or the left side edge 14. The inventors of the present invention have found that the most of the damage is caused by the movement of the twist mode in the FIGS. 3(B) and (C).

SUMMARY OF THE INVENTION

The object of the present invention is to provide a suspension assembly of high shock resistance type, whereby the damage of the magnetic recording disk is greatly reduced.

The further object of the present invention is to provide a hard disk drive device including the suspension assembly of high shock resistance type, whereby the damage of the magnetic recording disk is greatly reduced.

The suspension assembly is divided into three portions, i.e. a rear portion, one end of which can be pivotally mounted, a front portion supporting a slider including a read/write head for reading data from the magnetic recording disk or writing data to the magnetic recording disk, and a flexible hinge portion connecting the rear portion with the front portion.

According to the present invention, a protection layer is provided on a surface of the rear portion opposite to the recording disk at a position adjacent to the flexible hinge portion.

The protection layer is provided on a surface of the front portion opposite to the recording disk at a position adjacent to the flexible hinge portion.

At least one extruded portions are provided on a surface of the rear portion opposing to the recording disk at position adjacent to the flexible hinge portion.

The rear portion includes a metal plate opposite to the magnetic recording disk, and the metal plate is mechanically deformed to form the extruded portion, and the extruded portion is coated by an resilient layer made of a flexible polymer selected from a group consisting of polyimide, epoxy resin, polyetherurethane, rubber, silicone rubber, polyvinylchloride and polybutadiene.

Two extruded portions can be provided on a surface of the front portion opposing to the magnetic recording disk at a position adjacent to the flexible hinge portion, and the extruded portions are formed by the resilient layer on a flat portion of the front portion.

The suspension assembly comprises a mount plate one end of which can be pivotally mounted, a load beam having rear portion fixed to the mount plate, and the front portion, and having a flexible hinge portion between the rear portion and the front portion, and a metal plate including first portion and second portion. The first portion is fixed on the rear portion of the load beam, and the second portion is fixed on the front portion of the load beam. The second portion supports a slider including a read/write head for reading data from the magnetic recording disk or writing data to the recording disk.

Two extruded portions are provided in the second portion of the metal plate opposite to the recording disk at a position adjacent to the flexible hinge portion. Each of the extruded portions include a neck portion extending from the second portion and a dimple connected to the neck portion, and the resilient layer on the dimple, and the front portion of the load beam includes an aperture located on the underside of each dimple, with a diameter of the aperture being larger than a diameter of the dimple.

For a more complete understanding of the nature and advantages of the present invention reference should be made to the following detailed description take in conjunction with the accompanying drawings.

BRIEF DESCRIPTION OF THE DRAWINGS

FIG. 1 shows the structure of the prior art suspension assembly.

FIGS. 3(A)–3(C) show the parallel mode and the twisted mode in the motion of the suspension assembly.

FIG. 5 shows the detail structure of the middle part of the suspension assembly in accordance with the present invention.

FIG. 6 shows the structure of the integrated lead layer of the present invention.

FIGS. 7(A)–7(D) show the first embodiment of the present invention.

FIGS. 8(A)–8(D) show the second embodiment of the present invention.

FIGS. 9(A)–9(D) show the third embodiment of the present invention.

FIGS. 10(A)–10(D) show the fourth embodiment of the present invention.

DESCRIPTION OF THE PREFERRED EMBODIMENT

Figure 4:
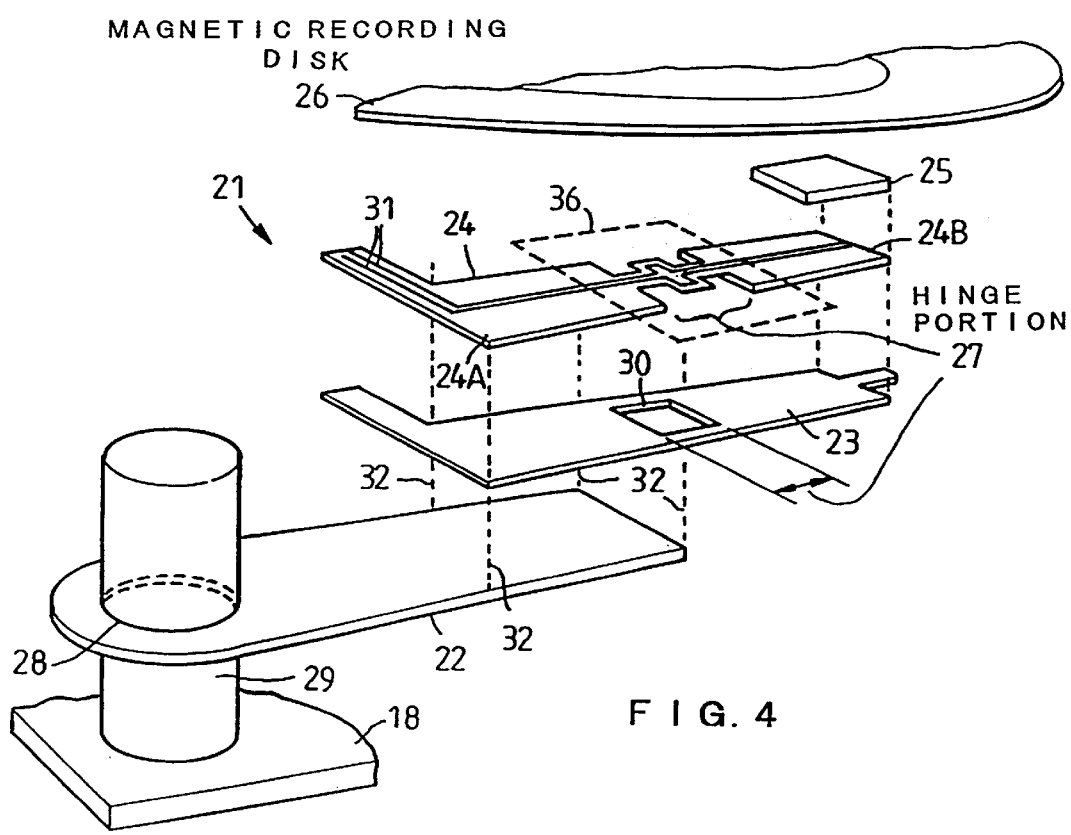
FIG. 4 shows the suspension assembly in accordance with the present invention.

The FIG. 4 shows the suspension assembly 21 which is the embodiment of the present invention. The suspension assembly 21 includes a mount plate 22, a load beam 23, an integrated lead layer 24 and a slider 25. The mount plate 22, the load beam 23 and the base plate of the integrated lead layer 24 are made of stainless steel. The mount plate 22 has an aperture 28 and is pivotally mounted on a shaft 29 fixed on the frame 18 of the hard disk drive device.

The load beam 23 includes a rear portion fixed to the free end of the mount plate 22, a front portion and a central portion defined by the length of the aperture 30 which provides the hinge portion 27.

Figure 2:
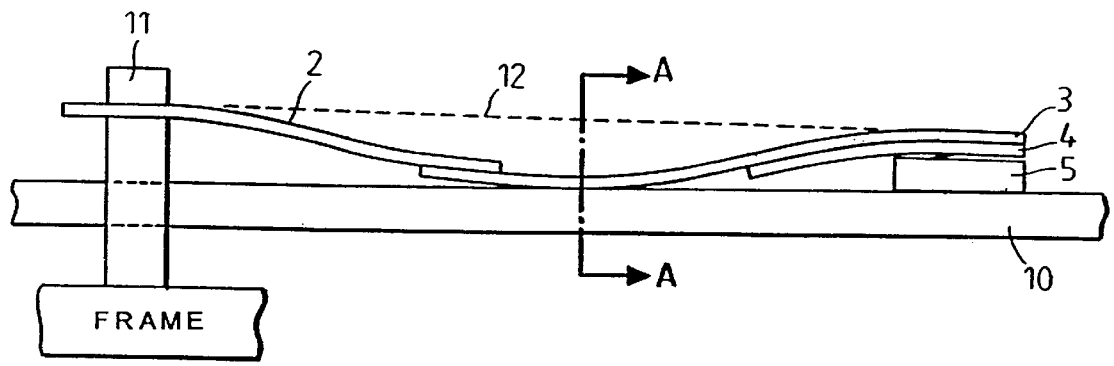
FIG. 2 shows the undesired motion of the suspension assembly.

One end of the load beam 23 is aligned with the free end of the mount plate 22 as shown by the dashed lines 32 and is fixed to the free end of the mount plate 22 by spot welding. The aperture 30 defines a hinge portion 27 of the suspension assembly 21. The slider 25 including the read/write head is directly mounted on the second portion 24B of the integrated lead layer 24 through the gimbal type supporting mechanism, not shown. The integrated lead layer 24 is divided to first portion 24A, second portion 24B and a central portion between the first portion 24A and the second portion 24B. The second portion 24B operates as the flexure 4 of the prior suspension assembly shown in the FIGS. 1 and 2.

The read/write head is biased to the surface of the magnetic recording disk 26 by the force applied by the load beam 23, and is floated from the surface of the magnetic recording disk 26 when the disk 26 is rotated. A motor, not shown, for rotating the magnetic recording disk 26 is mounted on the frame 18. The suspension assembly 21 is pivoted on the shaft 29 to move the read/write head along a radial direction of the recording disk 26. A control circuit for controlling the read/write operation, a motor control circuit, etc. are mounted on the frame of the hard disk drive device. These circuits are well known in the art and are not shown in the drawings.

In the case where a magneto resistance (MR) read/write head is used, four wiring conductors 31 connecting the read/write head to the read/write control circuit are provided on the integrated lead layer 24. For simplifying the FIG. 4, however, only two wiring conductors are shown. The detailed structure of the integrated lead layer 24 having the four wiring conductors is shown in the FIG. 5. The integrated lead layer 24 operates as a printed circuit board and the flexure for supporting the slider 25.

The integrated lead layer 24 shown in the FIG. 4 is fabricated by selectively etching a stacked three layered structure, shown in the FIG. 6, which includes a base metal layer 33, such as the stainless steel, an insulating or resilient layer 34, such as polyimide having a resilience, which has a less hardness than that of the surface of the magnetic recording disk 26, and an electrically conductive layer 31, such as copper (Cu). Insulating layer 34 may be made of a material such as polymide, epoxy resin, polyetherurethane, rubber, silicone rubber, polyvinylchloride or polybutadiene.

Again referring to the FIG. 5, the detailed structure of the portion of the integrated lead layer 24 enclosed by a dashed line 36 in the FIG. 4 is shown. As described before, the aperture 30 of the load beam 23, shown in the FIG. 4 defines the hinge portion 27 of the integrated lead suspension assembly 21. Therefore, the metal plate 33 of the stainless steel in the integrated lead layer 24 is removed at the portion corresponding to the aperture 30 to provide the flexibility required for the hinge portion 27. In other words, the polyimide layer 34 and the copper conductive wiring 31 are not supported by the stainless steel plate 33 at the hinge portion 27.

By removing the stainless steel plate 33 at the portion corresponding to the aperture 30, the designed biasing force of the load beam 23 can be applied to the slider 25.

The FIG. 7 shows the first embodiment of the present invention. The FIG. 7(A) shows the upper surface of the suspension assembly 21 opposite to the recording surface of the magnetic recording disk 26. It is noted that the slider 25 is not shown in the FIGS. 7 through 9 for simplifying the drawings. The FIG. 7(B) shows the cross sectional view of the suspension assembly 21 along a center line 37. The suspension assembly 21 is divided into three portions, i.e. a rear portion 39 the length of which is defined by the length of the mount plate 22, the hinge portion 27 defined by the aperture 30 of the load beam 23, and a front portion 38 to which the slider and the read/write head are attached.

In the first embodiment, before the integrated lead layer 24 is welded to the load beam 23, the two extruded portions, i.e. dimples 35 are provided at the position of the second portion of the metal plate 33 adjacent to the hinge portion 27. The FIG. 7(C) shows the cross section of the dimples 35 along the line A—A. A round shape as shown in the FIG. 7(C) or a flat shape as shown in the FIG. 7(D) can be used, since the material of the extruded portion 35 opposing to the surface of the magnetic recording disk 26 has the resilience and has a less hardness than that of the surface of the disk 26. To form the dimples or extruded portions 35, the stainless steel plate 33 and the resilient layer or protection layer 34 are mechanically deformed to form the extruded portion 33A, and the portion 34A of the resilient layer 34 which covers the extruded portion 33A is left in the etching process by masking the portion 34A. That is, the dimple 35 includes the extruded portion 33A of the metal plate 33 of the integrated lead layer 24 and the portion 34A of the resilient layer 34.

In the FIG. 7(C), the height H1 of the dimples 35 is higher than the total thickness of the metal layer 33, the resilient layer 34 and the electrically conductive layer 31 at the wiring section, whereby the collision or undesired contact of the conductive wiring 31 to the surface of the recording disk 26 is prevented, when the suspension assembly 21 is bent in the parallel mode shown in the FIG. 3(A) by the undesirable shock.

The dimple 35 could be formed by flat metal layer 33 and the resilient layer or protection layer 34B as shown in the FIG. 7(D). That is, the dimple is formed without deforming the metal layer 33. In this case, the height H2 of the dimple 35 is lower than the total thickness of the metal layer 33, the resilient layer 34 and the electrically conductive layer 31 at the wiring section. The lower height H2 is selected based upon the discovery by the inventors of the present invention that the most of the damage of the magnetic recording disk 26 are caused by the movement of the twist mode as shown in the FIG. 3(B) and (c). The dimples 35 of the lower height H2 are provided at the both sides of the center line 37 of the suspension assembly 21.

The FIG. 8 shows the second embodiment of the present invention. In the second embodiment, the two dimples 35 are provided at the first portion 24A of the integrated lead layer 24 adjacent to the hinge portion 27. The two extruded portions 35 are provided on the both sides of the center line of the suspension assembly 21. The FIG. 8(C) shows the cross section of the dimples 35 along the line B—B. As described with respect to the first embodiment, the stainless steel plate 33 is mechanically deformed to form the extruded portion 33A, and the portion 34A of the resilient layer 34 of the polyimide which covers the extruded portion 33A is left in the etching process by masking the portion 34A.

As in the first embodiment, the FIG. 8(C) shows the dimple 35 having the height H1 higher than the total thickness of the metal layer 33, the resilient layer 34 and the electrically conductive layer 31 at the wiring section, and the FIG. 8(D) shows the dimple 35 having the height H2 which include the flat metal layer 33 and the resilient layer 34B.

The FIG. 9 shows the third embodiment of the present invention. The structure of the dimple or the extruded portion 35 of the third embodiment differs from that of the dimples of the first and second embodiments.

The apertures 23A are formed in the load beam 23 at the lower side position of the dimples 35, as shown in the FIGS. 9(A), (C) and (D). The diameter of the aperture 23A is larger than the diameter of the dimple 35. The extruded portion 33A is connected to the metal layer 33 of the stainless steel through a neck portion 33C. The structure of the extruded portion 33A and the resilient portion or the protection layer 34A is substantially the same as the structures shown in the FIGS. 7(C) and 8(C).

The fine neck portion 33A operates as a damper or a shock absorber which absorbs the collision force applied to the suspension assembly 21. Accordingly, when the undesired force is applied to the suspension assembly 21, the dimple 35 can be moved in the direction of an arrow 40, so that the force applied to the surface of the magnetic recording disk 26 can be remarkably weakened.

The FIG. 10 shows the fourth embodiment of the present invention. In this embodiment, the resilient layer 34 is provided to cover the area of the first portion 24A of the integrated lead layer 24 which extends from one side edge of the suspension assembly 21 to the other side edge of the suspension assembly 21, and which is adjacent to the hinge portion 27, as shown in the FIGS. 10(A), (C) and (D).

As the cases shown in the FIGS. 7(D) and 8(D), the height H2 of the dimple 35 is lower than the total thickness of the metal layer 33, the resilient layer 34 and the electrically conductive layer 31 at the wiring section. The lower height H2 is selected based upon the discovery by the inventors of the present invention that the most of the damage of the magnetic recording disk 26 are caused by the movement of the twist mode as shown in the FIGS. 3(B) and (C). Polyimide is a resilient material having a hardness less than that of the surface of the magnetic recording disk 26 and acts as the insulating layer for insulating the electrically conductive layer 31 from the metal plate 33 of the wiring structure, and may be used as the resilient or protection layer. However, other resilient materials such as epoxy resin, polyetherurethane, rubber, silicone rubber, polyvinylchloride, or polybutadiene can be used as the resilient or protection layer 34 of extruded portion 35 facing or opposing to the surface of the magnetic recording disk 26.

To prevent the sharp edge(s) of the suspension assembly 21 from being contacted to the surface of the magnetic recording disk 26, although the extruded portions or dimples 35 are formed on the rear portion 39 opposing to the surface of the magnetic recording disk 26 at the position adjacent to the hinge portion 27 in the first embodiment, and are formed on the front portion 38 opposing to the surface of the magnetic recording disk 26 at the position adjacent to the hinge portion 27 in the second and third embodiments, four extruded portions 35 can be provided at the positions of the first embodiment and the position of the second and third embodiments.

The extruded portions 35 of the first and second embodiments can be replaced by the extruded portions 35 of the third embodiment, vice versa.

And, although the protection layer 34 forming the extruded portion is formed on the rear portion 39 in the fourth embodiment, the protection layer 34 can be provided on the front portion 38, or can be provided on both the rear portion 39 and front portion 38 which are adjacent to the hinge portion 27.

Although, in the FIG. 4, the rear end of the mount plate 22 is directly mounted on the shaft 29, the rear end of the mount plate 22 can be mounted to a front end of an arm (not shown in the FIG. 4) a rear end of which is pivotally mounted on the shaft 29.

The present invention solves the problem that the surface of the magnetic recording disk is damaged by the sharp edge of the suspension assembly when the undesired force is applied to the assembly.

While the preferred embodiments to the present invention had been illustrated in detail, it should be apparent that modifications and adaptations to those embodiments may occur to one skilled in the art without departing from the scope of the present invention as set forth in the following claims.

We claim:

1. A suspension assembly comprising:
   a front portion and a rear portion, said front portion supporting a slider including a head for reading data from a recording disk or writing data to said recording disk; and
   a flexible hinge portion connecting said rear portion layer is provided on a surface having at least one extruded dimple portion on said front portion opposing to said recording disk at a position adjacent to said flexible hinge portion.

2. A suspension assembly according to claim 1, wherein said protection layer is made of a resilient material.

3. A suspension assembly according to claim 2, wherein said resilient material is selected from a group consisting of polyimide, epoxy resin, polyetherurethane, rubber, silicone rubber, polyvinylchloride, or polybutadiene.

4. A suspension assembly comprising:
   a front portion and a rear portion, said front portion supporting a slider including a head for reading data from a recording disk or writing data to said recording disk; and
   a flexible hinge portion connecting said rear portion and said front portion, characterized in that at least one extruded dimple portion is provided on a surface of said front portion opposing to said recording disk at a position adjacent to said flexible hinge portion.

5. A suspension assembly according to claim 4, wherein two extruded dimple portions are provided on said surface of said front portion opposing to said recording disk at said position adjacent to said flexible hinge portion.

6. A suspension assembly according to claim 5, wherein said front portion includes a metal plate opposing to said recording disk, and said metal plate is mechanically deformed to form said extruded dimple portion, and said extruded dimple portion is coated by a resilient layer.

7. A suspension assembly according to claim 6, wherein said resilient layer is made of a material selected from a group consisting of polyimide, epoxy resin, polyetherurethane, rubber, silicone rubber, polyvinylchloride, or polybutadiene.

8. A suspension assembly according to claim 5, wherein said front portion includes a metal plate opposing to said recording disk, and said extruded dimple portion is formed by a resilient layer on a flat portion of said metal plate.

9. A suspension assembly according to claim 8, wherein said resilient layers made of a material is selected from a group consisting of polyimide, epoxy resin, polyetherurethane, rubber, silicone rubber, polyvinylchloride, or polybutadiene.

10. A suspension assembly comprising:
   a mount plate, one end of which is pivotally mounted;
   a load beam having a rear portion fixed to said mount plate, and a front portion, and having a flexible hinge portion between said rear portion and said front portion; and
   a metal plate including first portion and second portion, said first portion being fixed on said rear portion of said load beam and said second portion being fixed on said front portion of said load beam, said second portion supporting a slider including a read/write head for reading data from a recording disk or writing data to said recording disk, characterized in that two extruded dimple portions are provided in said second portion of said metal plate to oppose said recording disk at position adjacent to said flexible hinge portion, and said extruded portion includes a neck portion extending from said first portion, a dimple connected to said neck portion, and a resilient layer on said dimple, and said rear portion of said load beam includes an aperture, a diameter of which is larger than a diameter of said dimple at a position underside of said dimple.

11. A suspension assembly according to claim 10, wherein said resilient layer is made of a material selected from a group consisting of polyimide, epoxy resin, polyetherurethane, rubber, silicone rubber, polyvinylchloride, or polybutadiene.

12. A disk drive device comprising:
   a recording disk for recording data; and
   a suspension assembly;
   said suspension assembly comprising:
      a front portion and a rear portion, said front portion supporting a slider including a head for reading data from a recording disk or writing data to said recording disk, and a flexible hinge portion connecting said rear portion and said front portion, characterized in that a protection layer is provided on a surface having at least one extruded dimple portion on said front portion opposing to said recording disk at a position adjacent to said flexible hinge portion.

13. A disk drive device comprising:
   a recording disk for recording data; and
   a suspension assembly;
   said suspension assembly comprising: a front portion and a rear portion, said front portion supporting a slider including a head for reading data from a recording disk or writing data to said recording disk, and a flexible hinge portion connecting said rear portion and said front portion, characterized in that two extruded dimple portions are provided on a surface of said front portion opposing to said recording disk at a position adjacent to said flexible hinge portion.

* * * * *